3,456,041
BROMINATED PHOSPHITES AND PHOSPHONATES

George A. Burk, Bay City, and Donald N. De Mott, Midland, Mich., assignors to The Dow Chemical Company, Midland, Mich., a corporation of Delaware
No Drawing. Filed Jan. 16, 1967, Ser. No. 609,354
Int. Cl. C07f 9/02, 9/42
U.S. Cl. 260—961     5 Claims

ABSTRACT OF THE DISCLOSURE

The phosphites of 3-bromo-2,2-bis-(bromomethyl)-1-propanol and 3-bromo-2-bromomethyl-2-chloromethyl-1-propanol are stable white solids which are effective additives to impart flame resistance to combustible plastics, cellulosic materials, and the like. The corresponding phosphonates derivable from these phosphites have similar properties.

BACKGROUND OF THE INVENTION

The present invention relates to new chemical compounds and their use as additives to impart flame resistance to combustible plastics, cellulosic materials, and the like. More particularly, it relates to phosphites and phosphonates of polybrominated pentaerythritol.

Many bromine-containing compounds have been suggested as additives to increase the resistance to burning of combustible materials such as plastics, wood, paper, and cellulosic fibers. Phosphites and phosphonates have also been used for this purpose, especially those of brominated alcohols and phenols. Such compounds are effective, but their use as combustion-retarding additives has not reached the proportions that the desirability of rendering combustible materials more resistant to burning would suggest, largely because of certain disadvantages which are inherent in most of these prior art compounds. Brominated organic phosphites and phosphonates, for example, often lack sufficient resistance to degradation by heat, light, moisture, or combinations of these thereby causing discoloration, loss of strength or other physical properties, or emission of acid byproducts by the substrate materials containing them. Known compounds of this class may also be insufficiently compatible with the substrate to permit their use in effective proportions.

SUMMARY OF THE INVENTION

It has now been found that brominated phosphites and phosphonates of a particular structure are not only highly effective fire retardant additives for plastics, cellulosic materials, and the like, but that these compounds also possess unusual and unexpected thermal stability and resistance to photolytic and hydrolytic degradation. These new compounds are phosphites and phosphonates of polybrominated pentaerythritol as defined by one of the formulas

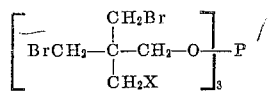

and

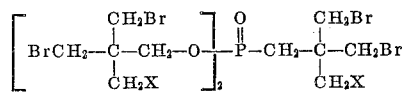

in each of which formulas X represents bromine or chlorine. Compounds where X is bromine are preferred.

DETAILED DESCRIPTION

The compounds of this invention are white crystalline solids of low to moderate melting points. The phosphites are conveniently prepared by reacting the trihalogenated pentaerythritol or derivative thereof with a phosphorus compound such as a phosphorous trihalide. The corresponding phosphonates are most conveniently prepared by a thermal rearrangement of the phosphite as shown in the examples.

Example 1

At the reflux temperature of the mixture, 22.9 g. of phosphorus tribromide was added over a period of 10 minutes to 61 g. of 3,3-bis(bromomethyl)oxetane in 200 ml. of methylene chloride. The reaction was complete after the mixture had been maintained for 5 hours at this temperature. The methylene chloride was then distilled from the reaction mixture, leaving as the residue a white crystalline solid melting at 88° C., weight 83 g. This was identified by elemental analysis and infrared spectroscopic examination as essentially pure tris(3-bromo-2,2-bis(bromomethyl)propyl)phosphite.

Example 2

A quantity of 34 g. of the phosphite product of Example 1 was added portionwise to a flask maintained at 185° C. Upon cooling, the product was found to be essentially pure bis(3-bromo-2,2-bis(bromomethyl)propyl) 3-bromo-2,2-bis(bromomethyl)propanephosphonate, a white solid melting at 153–155° C. The identity of the product was confirmed as the compound named by elemental analysis and infrared spectroscopic examination.

Example 3

A solution of 244 g. of 3,3-bis(bromomethyl)-oxetane in 500 ml. of carbon tetrachloride was stirred at reflux temperature while 46.9 g. of phosphorus trichloride was added portionwise. After addition of a gram of aluminum chloride failed to initiate a satisfactory rate of reaction, 0.5 ml. of concentrated sulfuric acid was added to the reaction mixture and heating at reflux was continued for a total of 26 hours. At that time, 2 ml. of boron trifluoride etherate was added to catalyze faster reaction and the mixture was heated at reflux for another 100 hours to react essentially all of the oxetane. After filtration of the mixture to remove solid by-products, the solvent was distilled from the filtrate to obtain as a residue 220 g. of a viscous liquid. This was found by infrared spectroscopic examination to be a mixture in about equal proportions of tris(3-chloro-2,2-bis(bromomethyl)propyl) phosphite and the phosphonate derived from it, bis(3-chloro-2,2-bis(bromomethyl)propyl) 3-chloro - 2,2 - bis (bromomethyl)propanephosphonate. Apparently, the prolonged heating of the reaction mixture had caused rearrangement of part of the phosphite product to the corresponding phosphonate. When the phosphite and phosphonate are separated and purified, as by chromatographic means, they are obtained as white solids of relatively low melting points.

The phosphites and phosphonates of this invention are effective additives to provide self-extinguishing resins when incorporated in resins such as polystyrene in concentrations of the order of 2 percent by weight. Because of the unique resistance of these compounds to thermal, hydrolytic, and photolytic degradation, resins containing them can be molded without significant corrosion of metal parts and the molded resins are highly resistant to yellowing and loss of other properties.

For similar reasons, these new compounds are effective and valuable additives to increase the resistance to fire of cellulosic materials such as wood, paper, and cellulosic fibers when applied thereto by conventional methods. Because of their effectiveness for this purpose, only minimal quantities of these compounds need be used and fiber strength and other properties of the cellulosic substrate are not significantly impaired.

We claim:

1. A compound having one of the formulas (A) 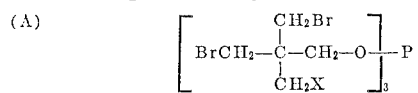

and (B) 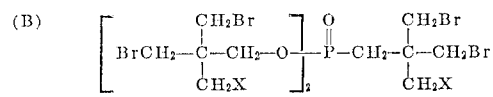

in each of which formulas X represents chlorine or bromine.

2. A compound as defined in claim 1 wherein X is bromine.

3. The compound of claim 1 having Formula A wherein X is bromine.

4. The compound of claim 1 having Formula B wherein X is bromine.

5. A compound as defined in claim 1 wherein X is chlorine.

References Cited

UNITED STATES PATENTS 2,866,806    12/1958    Markley et al. __ 260—967 XR
3,324,205    6/1967    Carpenter et al. __ 260—961 XR CHARLES B. PARKER, Primary Examiner A. H. SUTTO, Assistant Examiner U.S. Cl. X.R.

106—15; 260—45.7, 967, 969, 972